F. D. UDALL.
SHEAVE OR PULLEY.
APPLICATION FILED FEB. 21, 1914.
1,222,818.
Patented Apr. 17, 1917.
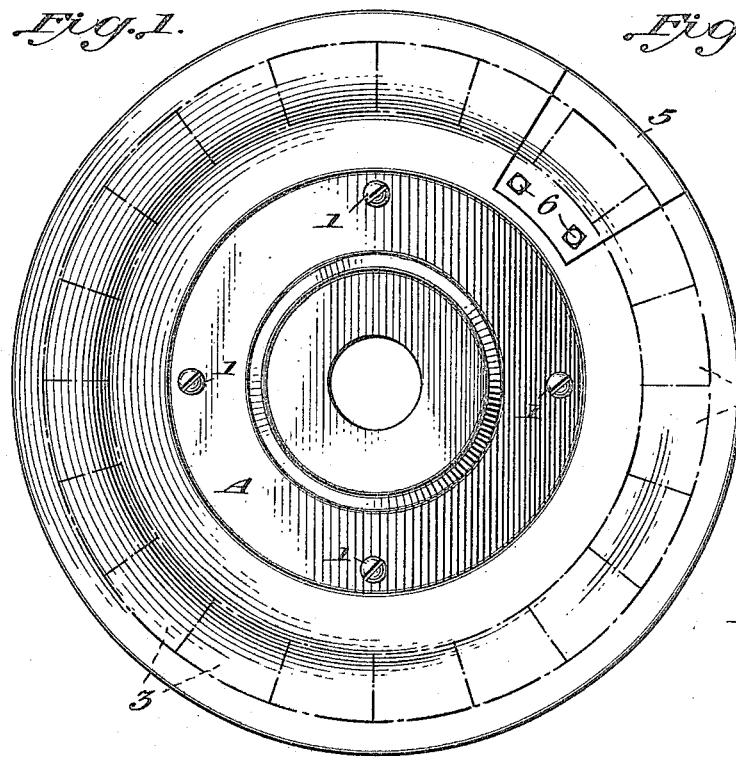
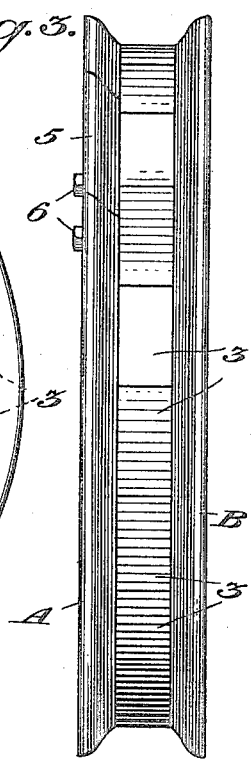
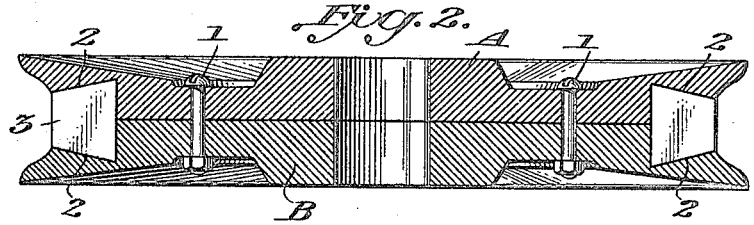

UNITED STATES PATENT OFFICE.

FRANK D. UDALL, OF IRONWOOD, MICHIGAN.

SHEAVE OR PULLEY.

1,222,818. Specification of Letters Patent. Patented Apr. 17, 1917.

Application filed February 21, 1914. Serial No. 820,245.

*To all whom it may concern:*

Be it known that I, FRANK D. UDALL, citizen of the United States, residing at Ironwood, in the county of Gogebic and State of Michigan, have invented certain new and useful Improvements in Sheaves or Pulleys, of which the following is a specification.

My invention relates to an improvement in rope sheaves or pulleys, and the object is to provide a removable sectional wooden filling within the groove formed in the periphery of a metal sheave or pulley.

In the accompanying drawings:

Figure 1 is a view in side elevation;

Fig. 2 is a vertical sectional view; and

Fig. 3 is a view in elevation.

The sheave or pulley consists of two sections A and B, preferably constructed of metal, and the two sections are connected together by means of screw bolts 1, 1. Formed in the periphery of the wheel or sheave is an annular dove-tailed groove 2, one half of the groove being formed in each section A and B.

Received in the groove is a filler or wearing surface for the rope or cable. This filler consists of blocks 3, 3, which are provided with beveled surfaces to conform to the shape of the dovetailed groove 2 of the sheave or pulley.

These blocks are inserted in the groove through an opening formed in the wall of the section A.

A plate 5 is removable from the section A, where it is held by screw bolts 6, 6. When it is desired to insert filler blocks 3, 3, these bolts 6, 6 and plate 5 are removed, and the blocks 3, 3 are inserted, until the groove 2 is filled, and plate 5 is bolted in place closing the opening in rim A.

After having inserted the blocks 3, 3, the sections A and B are drawn securely together by the bolts 1, 1, tightly clamping the blocks 3, 3, with uniform pressure throughout upon opposite sides.

A sheave or pulley of this construction will last indefinitely because the wearing surface of any part thereof is easily removable at any time without either taking the pulley apart or the necessity of removing it from its shaft.

I claim:

A sheave comprising two substantially similar sections, detachably connected together and forming therebetween a dove-tailed peripheral groove, one section having an opening, a plate removably secured over said opening, a plurality of filler blocks laterally insertible through said opening in one of said sections, and means which secures the two sections together causing lateral clamping pressure upon the blocks.

In testimony whereof I affix my signature, in the presence of two witnesses.

FRANK D. UDALL.

Witnesses:
CHARLES M. HUMPHREY,
ELSIE SCHMEISER.

Copies of this patent may be obtained for five cents each, by addressing the "Commissioner of Patents, Washington, D. C."